(12) United States Patent
Wu

(10) Patent No.: US 12,317,355 B2
(45) Date of Patent: May 27, 2025

(54) PROCESSING METHOD AND DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 331 days.

(21) Appl. No.: 17/551,868

(22) Filed: Dec. 15, 2021

(65) Prior Publication Data

US 2022/0110182 A1 Apr. 7, 2022

Related U.S. Application Data

(63) Continuation of application No. PCT/CN2020/097790, filed on Jun. 23, 2020.

(30) Foreign Application Priority Data

Jun. 28, 2019 (CN) .......................... 201910578518.6

(51) Int. Cl.
*H04W 76/19* (2018.01)
*H04W 28/02* (2009.01)

(52) U.S. Cl.
CPC ....... *H04W 76/19* (2018.02); *H04W 28/0284* (2013.01)

(58) Field of Classification Search
CPC .......................... H04W 28/0284; H04W 76/19

USPC .......................................................... 370/329
See application file for complete search history.

(56) References Cited

U.S. PATENT DOCUMENTS

| 8,750,849 | B1* | 6/2014 | Adib ....................... H04L 47/10 |
| | | | 455/412.2 |
| 2004/0209623 | A1* | 10/2004 | Sauter .................... H04W 48/06 |
| | | | 455/453 |
| 2006/0268707 | A1* | 11/2006 | Lee ......................... H04L 47/11 |
| | | | 370/232 |
| 2011/0207485 | A1* | 8/2011 | Dimou ............... H04W 36/0079 |
| | | | 455/507 |

(Continued)

FOREIGN PATENT DOCUMENTS

| CN | 106941397 A | 7/2017 |
| CN | 108810905 A | 11/2018 |

(Continued)

OTHER PUBLICATIONS

Vivo, "Discussion on the Systematic Failure of the UL transmission," 3GPP TSG-RAN WG2 Meeting #105bis R2-1803081, Xi'an, China, Apr. 8-Apr. 12, 2019 (3 pages).

(Continued)

*Primary Examiner* — Robert J Lopata
(74) *Attorney, Agent, or Firm* — Price Heneveld LLP

(57) ABSTRACT

A processing method and a device are provided. The method includes: performing a target operation in a case of detecting that an uplink congestion failure has occurred on a first (Continued)

subband, where the target operation includes at least one of the following: a first operation and a second operation, the first operation is transmitting an uplink signal to a network device, the second operation is triggering a wireless connection re-establishment procedure, and the uplink signal is used to indicate failure information of the uplink congestion failure.

14 Claims, 3 Drawing Sheets

(56) References Cited

U.S. PATENT DOCUMENTS

| | | | | |
|---|---|---|---|---|
| 2012/0236707 | A1* | 9/2012 | Larsson | H04W 76/19 370/217 |
| 2013/0121147 | A1* | 5/2013 | Tapia | H04W 24/02 370/230 |
| 2014/0233390 | A1* | 8/2014 | Schmid | H04W 28/0289 370/236 |
| 2015/0312827 | A1* | 10/2015 | Okita | H04W 28/0226 455/438 |
| 2018/0132300 | A1* | 5/2018 | Viering | H04W 76/19 |
| 2020/0068546 | A1 | 2/2020 | Wu et al. | |
| 2021/0315043 | A1* | 10/2021 | Luo | H04W 76/19 |
| 2021/0337593 | A1* | 10/2021 | Fujishiro | H04W 24/08 |
| 2023/0164843 | A1* | 5/2023 | Wang | H04W 74/0816 370/329 |
| 2023/0389072 | A1* | 11/2023 | Jang | H04W 74/0833 |
| 2024/0090019 | A1* | 3/2024 | Chen | H04W 36/0058 |

FOREIGN PATENT DOCUMENTS

| | | |
|---|---|---|
| CN | 109863777 A | 6/2019 |
| CN | 110519794 A | 11/2019 |
| WO | 2017136458 A2 | 8/2017 |

OTHER PUBLICATIONS

Lenovo, Motorola Mobility, "Impact of systematic LBT failure on UL transmission procedure," 3GPP TSG-RAN WG2 Meeting #105bis R2-1904128, Xi'an, China, Apr. 8-12, 2019 (2 pages).

Nokia, Nokia Shanghai Bell, "UL LBT failure handling," 3GPP TSG-RAN WG2 Meeting #106, R2-1906758, Reno, USA May 13-17, 2019 (2 pages).

Ericsson, "Handling UL LBT failures," 3GPP TSG-RAN WG2 #106, Tdoc R2-1907584, Reno, US, May 13-17, 2019.

Lenoco, "Impact of systematic LBT failure on UL transmission procedure", 3GPP TSG-RAN WG2 Meeting #106, R2-1906727, Reno, USA, May 13-17, 2019.

Oppo, "LBT failure counter for uplink transmission in NR-U", 3GPP TSG-RAN WG2 Meeting #106, R2-1905615, Reno, USA, May 13-May 17, 2019.

* cited by examiner

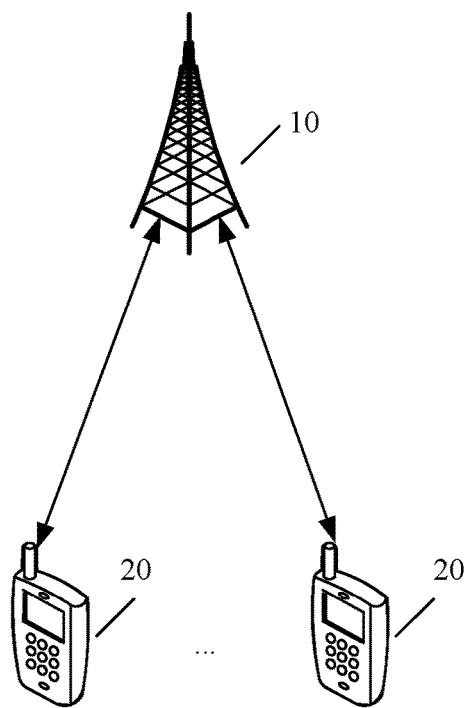
FIG. 1
A terminal device performs a target operation in a case of detecting that an uplink congestion failure has occurred on a first subband ⏤ 201
FIG. 2
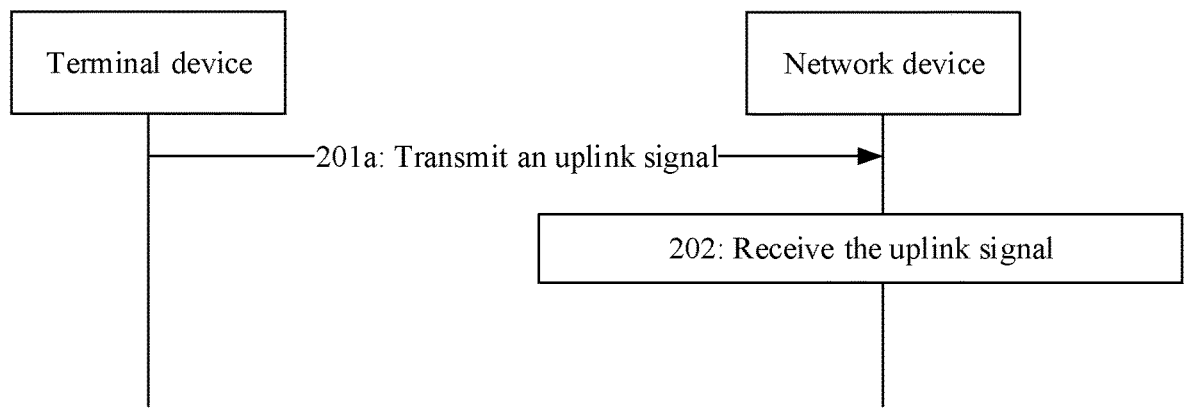
FIG. 3

PROCESSING METHOD AND DEVICE

CROSS-REFERENCE TO RELATED APPLICATIONS

This disclosure is a continuation application of PCT International Application No. PCT/CN2020/097790 filed on Jun. 23, 2020, which claims priority to Chinese Patent Application No. 201910578518.6, filed with the China National Intellectual Property Administration on Jun. 28, 2019 and entitled "PROCESSING METHOD AND DEVICE", the disclosures of which are incorporated herein by reference in their entireties.

TECHNICAL FIELD

This application relates to the field of communications technologies, and in particular, to a processing method and a device.

BACKGROUND

At present, a 5G communications system can transmit and receive a signal when operating on an unlicensed band, and a transmitter needs to perform listen before talk (LBT) on the unlicensed band before transmitting a signal. If the transmitter detects that the band has not been occupied, that is, if the transmitter detects that the band is in an idle state, it may transmit a signal. On the contrary, if the transmitter detects that the band has been occupied, it cannot transmit a signal.

Specifically, when user equipment (UE) transmits an uplink signal, it needs to perform LBT in a specified frequency range (for example, a specified subband), and when it detects that the specified frequency range is occupied, an uplink transmission failure is caused. When the number of uplink transmission failures in the specified frequency range of the UE reaches a predetermined number, the UE can determine that an uplink congestion failure has occurred.

However, there is currently no effective processing solution for a scenario in which an uplink congestion failure has occurred in a specified frequency range.

SUMMARY

Embodiments of this disclosure provide a processing method and a device.

According to a first aspect, an embodiment of this disclosure provides a processing method applied to a terminal device, where the method includes:

performing a target operation in a case of detecting that an uplink congestion failure has occurred on a first subband, where the target operation includes at least one of the following: a first operation and a second operation, where the first operation is transmitting an uplink signal to a network device, the second operation is triggering a wireless connection re-establishment procedure, and the uplink signal is used to indicate failure information of the uplink congestion failure.

According to a second aspect, an embodiment of this disclosure provides a processing method applied to a network device, where the method includes:

receiving an uplink signal from a terminal device, where the uplink signal is used to indicate failure information of an uplink congestion failure that has occurred on a first subband.

According to a third aspect, an embodiment of this disclosure provides a terminal device, including:

an execution module, configured to perform a target operation in a case of detecting that an uplink congestion failure has occurred on a first subband, where the target operation includes at least one of the following: a first operation and a second operation, where the first operation is transmitting an uplink signal to a network device, the second operation is triggering a wireless connection re-establishment procedure, and the uplink signal is used to indicate failure information of the uplink congestion failure.

According to a fourth aspect, an embodiment of this disclosure provides a network device, including:

a receiving module, configured to receive an uplink signal from a terminal device, where the uplink signal is used to indicate failure information of an uplink congestion failure that has occurred on a first subband.

According to a fifth aspect, an embodiment of this disclosure provides a terminal device, including a processor, a memory, and a computer program stored in the memory and running on the processor, where when the computer program is executed by the processor, the steps of the processing method according to the first aspect are implemented.

According to a sixth aspect, an embodiment of this disclosure provides a network device, including a processor, a memory, and a computer program stored in the memory and running on the processor, where when the computer program is executed by the processor, the steps of the processing method according to the second aspect are implemented.

According to a seventh aspect, an embodiment of this disclosure provides a computer-readable storage medium, where the computer-readable storage medium stores a computer program, and when the computer program is executed by a processor, the steps of the foregoing processing method are implemented.

BRIEF DESCRIPTION OF DRAWINGS

FIG. 1 is a possible schematic structural diagram of a communications system in an embodiment of this disclosure;

FIG. 2 is a first schematic flowchart of a processing method according to an embodiment of this disclosure;

FIG. 3 is a second schematic flowchart of a processing method according to an embodiment of this disclosure;

DESCRIPTION OF EMBODIMENTS

Figure 4:
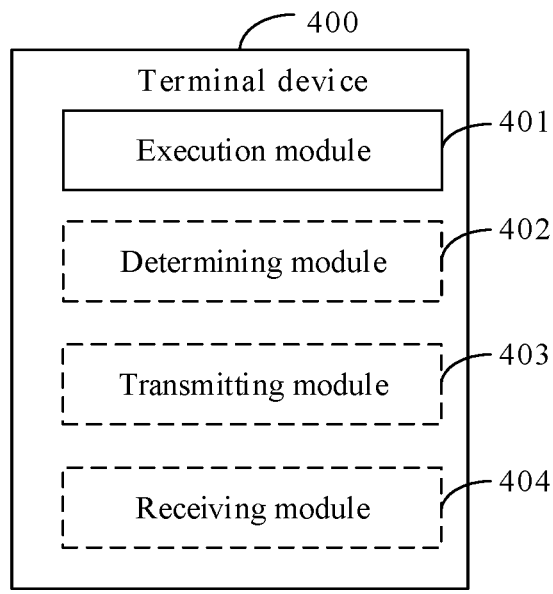
FIG. 4 is a first schematic structural diagram of a terminal device according to an embodiment of this disclosure.

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that persons of ordinary skill in the art obtain based on the embodiments of this disclosure shall fall within the protection scope of this application.

It should be noted that "I" in this specification represents or, for example, A/B may represent A or B; and that the term "and/or" in this specification describes only an association relationship for describing associated objects and represents that three relationships may exist, for example, A and/or B may represent the following three cases: A alone, both A and B, and B alone.

It should be noted that, for ease of clear description of the technical solutions of the embodiments of this application, in the embodiments of this application, the words "first", "second", and the like are used to distinguish the same items or similar items having substantially the same functions or roles, and those skilled in the art can understand that the words "first", "second", and the like do not constitute any limitation on a quantity and an execution order. For example, a first cell and a second cell are used to distinguish different cells, rather than to describe a specific order of the cells.

It should be noted that, in the embodiments of this disclosure, terms such as "an example" or "for example" are used to represent an example, an instance, or an illustration. Any embodiment or design solution described as "an example" or "for example" in the embodiments of this disclosure shall not be interpreted as being more preferred or advantageous than other embodiments or design solutions. Specifically, the terms such as "an example" or "for example" are used to present related concepts in a specific manner.

It should be noted that in the embodiments of this application, "of", "relevant (or corresponding)" and "corresponding" can sometimes be used interchangeably. It should be noted that their meanings are the same without emphasizing their differences. In the embodiments of this application, "a plurality of" means two or more.

The technical solutions provided in this disclosure can be applied to various communications systems such as a 5G communications system, a future evolved system, or a plurality of communication fusion systems. A plurality of application scenarios may be included, such as machine to machine (M2M), D2M, macro-micro communications, enhanced mobile Internet (eMBB), ultra reliable and low latency communications (uRLLC), and massive machine type communications (mMTC). These scenarios include, but are not limited to, scenarios such as communication between terminal devices, communication between network devices, or communication between a network device and a terminal device. The embodiments of this disclosure can be applied to communication between a network device and a terminal device, or communication between terminal devices, or communication between network devices in a 5G communications system.

FIG. 1 is a possible schematic structural diagram of a communications system in an embodiment of this disclosure. As shown in FIG. 1, the communications system includes at least one network device 10 (only one is shown in FIG. 1) and one or more terminal devices 20 connected to each network device 10.

The network device 10 may be a base station, a core network device, a transmission and reception point (TRP), a relay station, an access point, or the like. The network device 10 may be a base transceiver station (BTS) in a global system for mobile communications (GSM) or code division multiple access (CDMA) network, may be an NB (NodeB) in wideband code division multiple access (WCDMA), or may be an eNB or eNodeB (evolved NodeB) in LTE. The network device 10 may alternatively be a wireless controller in a cloud radio access network (CRAN) scenario. The network device 10 may alternatively be a network device in a 5G communications system or a network device in a future evolved network. However, the terms do not constitute a limitation on this disclosure.

The terminal device 20 may be a wireless terminal device or a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, a terminal device in a future evolved PLMN network, or the like. The wireless terminal device may communicate with one or more core networks through a radio access network (RAN). The wireless terminal device may be a mobile terminal device, such as a mobile phone (also referred to as a "cellular" phone) and a computer provided with a mobile terminal device, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communications service (PCS) phone, a cordless telephone set, a session initiation protocol (SIP) phone, a wireless local loop (WLL) station, or a personal digital assistant (PDA). The wireless terminal device may also be a mobile device, user equipment (UE), a UE terminal device, an access terminal device, a wireless communications device, a terminal device unit, a terminal device station, a mobile station, a mobile, a remote station, a remote terminal unit, a remote terminal, a subscriber unit, a subscriber station, a user agent, or a terminal device apparatus. In an example, in this embodiment of this disclosure, the terminal device shown in FIG. 1 is a mobile phone.

FIG. 2 is a schematic flowchart of a processing method according to an embodiment of this disclosure. As shown in FIG. 2, the processing method may include the following steps.

Step 201: A terminal device performs a target operation in a case of detecting that an uplink congestion failure has occurred on a first subband.

In this embodiment of this disclosure, the first subband is: at least one of one or more subbands configured by a network device for a target cell, and/or at least one of one or more subbands configured by a network device for a target bandwidth part (BWP). The target cell is any cell of the terminal device, and the target BWP is one or more BWPs for a cell of the terminal device.

In an example, the first subband may be an LBT subband configured by the network device for the terminal device.

In this embodiment of this disclosure, the target operation includes at least one of the following: a first operation and a second operation. The first operation is transmitting an uplink signal to a network device, and the second operation is triggering a wireless connection re-establishment procedure.

In this embodiment of this disclosure, the uplink signal is used to indicate failure information of the uplink congestion failure.

Optionally, in this embodiment of this disclosure, the uplink signal includes at least one of the following: a random access channel signal, Msg3 information of a random access procedure, a scheduling request (SR) signal, and a radio resource control (RRC) message, and a media access control (MAC) control element.

For example, the random access channel signal may be a dedicated random access resource configured by the network device for the terminal device; the Msg3 information of the random access procedure may be the failure information of the uplink congestion failure that is carried in the Msg3 information of the random access procedure, for example, the Msg3 information carries an RRC message or a MAC control element to indicate the first subband; and the SR signal may be a dedicated SR resource configured by the network device for the terminal device.

Optionally, in this embodiment of this disclosure, the failure information of the uplink congestion failure is used to indicate at least one of the following: a number of the first subband, a frequency of the first subband, a bandwidth of the first subband, a cell corresponding to the first subband, and a BWP corresponding to the first subband. In an example, the failure information of the uplink congestion failure includes at least one of the following: a number of the first subband, a frequency of the first subband, a bandwidth of the first subband, a cell corresponding to the first subband, and a BWP corresponding to the first subband.

Optionally, in this embodiment of this disclosure, different uplink signals are used to indicate failure information of different uplink congestion failures. For example, a dedicated random access channel signal 1 for the terminal device is used to indicate that an uplink congestion failure has occurred on a subband 1.

Optionally, in this embodiment of this disclosure, in a case that the terminal device has encountered an uplink congestion failure on a plurality of first subbands and that the plurality of first subbands belong to a same cell, the terminal considers that an uplink congestion failure has occurred in the cell.

For example, if a subband configured by the network device for a first cell of the terminal device includes the first subband, before the terminal device performs a target operation, the method further includes step A1.

Step A1: If the number of first subbands is greater than or equal to M, the terminal device determines that an uplink congestion failure has occurred in the first cell.

M is a positive integer.

M may be configured by the network device or prescribed in a protocol. This application does not impose limitation thereto.

For example, it is assumed that the network device has configured five subbands for cell 1 and that a cell uplink congestion failure detection threshold (that is, the foregoing predetermined number) is 3. Example 1: In a case that an uplink congestion failure has occurred on three of the five subbands, the terminal device may determine that an uplink congestion failure has occurred in cell 1. Example 2: In a case that an uplink congestion failure has occurred on all the five subbands, the terminal device may also determine that an uplink congestion failure has occurred in cell 1.

Optionally, in this embodiment of this disclosure, that is, in a case that the uplink congestion failure has occurred in the cell of the terminal device, the target operation performed by the terminal device may include at least one of the following:

(1) in a case that an uplink congestion failure has occurred in a primary cell (PCell) of the terminal device, the target operation includes at least one of the following: the first operation and the second operation;

(2) in a case that an uplink congestion failure has occurred in a primary secondary cell (PSCell) of the terminal device, the target operation is the first operation;

(3) in a case that an uplink congestion failure has occurred in all cells of a master cell group (MCG) of the terminal device, the target operation includes at least one of the following: the first operation and the second operation;

(4) in a case that an uplink congestion failure has occurred in all cells of a secondary cell group (SCG) of the terminal device, the target operation is the first operation; and (5) in a case that an uplink congestion failure has occurred in a secondary cell (SCell) of the terminal device, the target operation is the first operation.

It should be noted that the SCell may be an SCell in the MCG or an SCell in the SCG.

For example, in a case that the uplink congestion failure has occurred in all the cells of the SCG of the terminal device, the terminal device may report the failure information of the uplink congestion failure to the network device through the SCell of the MCG; in a case that the uplink congestion failure has occurred in the PCell of the terminal device, the terminal device may report the failure information of the uplink congestion failure to the network device through the SCell of the MCG or SCG; in a case that the uplink congestion failure has occurred in the PSCell of the terminal device, the terminal device may report the failure information of the uplink congestion failure to the network device through the SCell of the MCG or SCG; and in a case that the uplink congestion failure has occurred in the SCell of the terminal device, the terminal device may report the failure information of the uplink congestion failure to the network device through another cell of the MCG or SCG in which no uplink congestion failure has occurred.

In the processing method provided in this embodiment of this disclosure, the terminal device performs the target operation in a case of detecting that the uplink congestion failure has occurred on the first subband, where the target operation includes at least one of the following: an operation of transmitting an uplink signal to a network device by the terminal device, and an operation of triggering a wireless connection re-establishment procedure, so that an effective processing operation can be performed in a case that the uplink congestion failure has occurred on the first subband, thereby restoring data transmission and reception in a timely manner and improving communication efficiency.

Optionally, in this embodiment of this disclosure, in a case that the target operation is the first operation, the foregoing step 201 specifically includes the following step 201a.

Step 201a: The terminal device transmits the uplink signal to the network device in a case of detecting that an uplink congestion failure has occurred on the first subband.

Further optionally, in this embodiment of this disclosure, the foregoing step 201a specifically includes the following step 201a1.

Step 201a1: The terminal device transmits the uplink signal to the network device on a second subband.

In this embodiment of this disclosure, the second subband is a subband on which no uplink congestion failure has occurred.

In this embodiment of this disclosure, the second subband includes at least one of the following: a subband on which no uplink congestion failure has occurred in a second cell, and a subband on which no uplink congestion failure has occurred in a third cell, where the second cell is a cell corresponding to the first subband; and the third cell is different from the second cell.

Further, in this embodiment of this disclosure, the subband on which no uplink congestion failure has occurred in the second cell includes at least one of the following: a subband on which no uplink congestion failure has occurred in a first bandwidth part BWP of the second cell, and a subband on which no uplink congestion failure has occurred in a second BWP of the second cell, where the first BWP is a BWP corresponding to the first subband, and the second BWP is another subband in the second cell different from the first BWP.

Example 1: It is assumed that the network device has configured two LBT subbands for a cell of the terminal device: LBT subband 1 and LBT subband 2. In a case that an uplink congestion failure has occurred on LBT subband 1, the terminal device transmits an uplink signal on LBT subband 2, to notify the network device that the uplink congestion failure has occurred on LBT subband 1.

Example 2: It is assumed that the network device has configured two BWPs, BWP2 and BWP3, for cell 1 of the terminal device, and has configured LBT subband 3 and LBT subband 4 for BWP2 and LBT subband 5 and LBT subband 6 for BWP3. In a case that an uplink congestion failure has occurred on LBT subband 3, the terminal device may transmit the uplink signal on LBT subband 4 of BWP2, or may transmit the uplink signal on LBT subband 5 or LBT subband 6 of BWP3, to notify the network device that the uplink congestion failure has occurred on LBT subband 3.

Further optionally, for a scenario in which the target operation is the first operation, that is, for a scenario in which the terminal device transmits the uplink signal to the network device, after receiving the uplink signal transmitted by the terminal device, the network device may determine, based on the uplink signal, the first subband on which the uplink congestion failure has occurred.

For example, as shown in FIG. 3, based on the foregoing step 201a, after the foregoing step 201a, the method further includes the following step 202.

Step 202: The network device receives the uplink signal from the terminal device.

The uplink signal is used to indicate failure information of the uplink congestion failure that has occurred on the first subband.

For example, because the uplink signal is used to indicate the failure information of the uplink congestion failure, and the failure information of the uplink congestion failure usually can indicate the first subband on which the uplink congestion failure has occurred, the network device can determine, based on the uplink signal, the first subband on which the uplink congestion failure has occurred, so that data transmission and reception can be restored on another subband (that is, a subband different from the first subband), reducing data interruption delay and improving communication efficiency.

Further optionally, in this embodiment of this disclosure, in combination with the foregoing step 201a, after step 201a, the method further includes the following step 203.

Step 203: The terminal device receives feedback information from the network device.

In an example, the feedback information may be Msg2 information of a random access procedure or Msg4 information of a random access procedure.

In an example, the terminal device may receive the feedback information from the network device on a third subband, where the third subband is a subband on which no uplink congestion failure has occurred.

For example, the third subband may be the second subband in step 201a1. Example 1: Assuming that the terminal device has transmitted a terminal device-specific random access channel signal 1 (that is, the uplink signal) on subband 2 of BWP1, the terminal device receives, on LBT subband 2 of BWP1, the Msg2 information of the random access procedure (that is, the feedback information) transmitted by the network device. Example 2: Assuming that the terminal device has transmitted Msg3 information of the random access procedure (that is, the uplink signal) on subband 2 of BWP1, the terminal device receives, on LBT subband 2 of BWP1, the Msg4 information of the random access procedure (that is, the feedback information) transmitted by the network device.

In this embodiment of this disclosure, after receiving the uplink signal transmitted by the terminal device, the network device can determine, based on the uplink signal, the first subband on which the uplink congestion failure has occurred, so that the network device can timely know the subband on which the uplink congestion failure has occurred, and thus data transmission and reception can be restored on another subband, reducing data interruption delay and improving communication efficiency.

FIG. 4 is a possible structural diagram of a terminal device provided for implementing the embodiments of this disclosure. As shown in FIG. 4, the terminal device 400 includes an execution module 401, where the execution module 401 is configured to perform a target operation in a case of detecting that an uplink congestion failure has occurred on a first subband. The target operation includes at least one of the following: a first operation and a second operation, where the first operation is transmitting an uplink signal to a network device, the second operation is triggering a wireless connection re-establishment procedure, and the uplink signal is used to indicate failure information of the uplink congestion failure.

Optionally, as shown in FIG. 4, the terminal device 400 further includes a determining module 402, where the determining module 402 is configured to, in a case that a subband configured by the network device for a first cell of the terminal device includes the first subband, if the number of first subbands is greater than or equal to M, determine that the uplink congestion failure has occurred in the first cell, where M is a positive integer, and M is configured by the network device or prescribed in a protocol.

Optionally, as shown in FIG. 4, the terminal device 400 further includes a transmitting module 403, where the transmitting module 403 is configured to transmit the uplink signal to the network device on a second subband, where the second subband is a subband on which no uplink congestion failure has occurred.

Optionally, the second subband includes at least one of the following: a subband on which no uplink congestion failure has occurred in a second cell, and a subband on which no uplink congestion failure has occurred in a third cell, where the second cell is a cell corresponding to the first subband, and the third cell is different from the second cell.

Optionally, the subband on which no uplink congestion failure has occurred in the second cell includes at least one of the following: a subband on which no uplink congestion failure has occurred in a first bandwidth part BWP of the second cell, and a subband on which no uplink congestion failure has occurred in a second BWP of the second cell, where the first BWP is a BWP corresponding to the first subband, and the second BWP is another subband in the second cell different from the first BWP.

Optionally, as shown in FIG. 4, the terminal device 400 further includes a receiving module 404, where the receiving module 404 is configured to receive feedback information from the network device.

Optionally, the receiving module 404 is specifically configured to receive the feedback information from the network device on a third subband, where the third subband is a subband on which no uplink congestion failure has occurred.

Optionally, the uplink signal includes at least one of the following: a random access channel signal, Msg3 information of a random access procedure, an SR signal, an RRC message, and a MAC control element.

Optionally, the failure information of the uplink congestion failure is used to indicate at least one of the following: a number of the first subband, a frequency of the first subband, a bandwidth of the first subband, a cell corresponding to the first subband, and a BWP corresponding to the first subband.

Optionally, in a case that an uplink congestion failure has occurred in a primary cell of the terminal device, the target operation includes at least one of the following: the first operation and the second operation; in a case that an uplink congestion failure has occurred in a primary secondary cell of the terminal device, the target operation is the first operation; in a case that an uplink congestion failure has occurred in all cells of a primary cell group of the terminal device, the target operation includes at least one of the following: the first operation and the second operation; in a case that an uplink congestion failure has occurred in all cells in a secondary cell group of the terminal device, the target operation is the first operation; and in a case that an uplink congestion failure has occurred in a secondary cell of the terminal device, the target operation is the first operation.

In the terminal device provided in this embodiment of this disclosure, the terminal device performs the target operation in a case of detecting that the uplink congestion failure has occurred on the first subband, where the target operation includes at least one of the following: an operation of transmitting an uplink signal to a network device by the terminal device, and an operation of triggering a wireless connection re-establishment procedure, so that an effective processing operation can be performed in a case that the uplink congestion failure has occurred on the first subband, improving communication efficiency.

The terminal device provided in this embodiment of this disclosure can implement the procedures of the foregoing method embodiment shown in FIG. 2 or FIG. 3. To avoid repetition, details are not described herein again.

Figure 5:
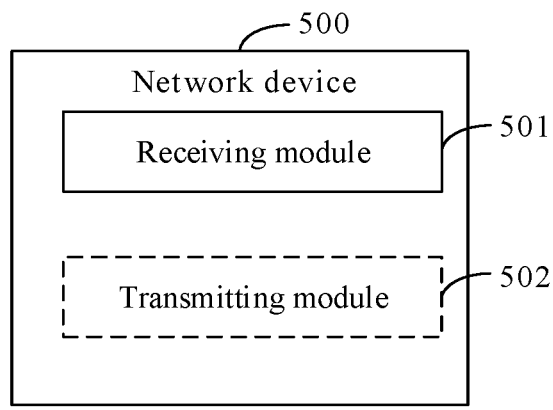
FIG. 5 is a first schematic structural diagram of a network device according to an embodiment of this disclosure.

FIG. 5 is a possible structural diagram of a network device provided for implementing the embodiments of this disclosure. As shown in FIG. 5, the network device 500 includes a receiving module 501, where the receiving module 501 is configured to receive an uplink signal from a terminal device, where the uplink signal is used to indicate failure information of an uplink congestion failure that has occurred on a first subband.

Optionally, as shown in FIG. 5, the network device 500 further includes a transmitting module 502, where the receiving module 501 is specifically configured to receive the uplink signal from the terminal device on a second subband; and the transmitting module 502 is configured to transmit feedback information to the terminal device on the second subband.

Optionally, the uplink signal includes at least one of the following: a random access channel signal, Msg3 information of a random access procedure, an SR signal, an RRC message, and a MAC control element.

Optionally, the failure information of the uplink congestion failure is used to indicate at least one of the following: a number of the first subband, a frequency of the first subband, a bandwidth of the first subband, a cell corresponding to the first subband, and a BWP corresponding to the first subband.

In the network device provided in this embodiment of this disclosure, after receiving the uplink signal transmitted by the terminal device, the network device can determine, based on the uplink signal, the first subband on which the uplink congestion failure has occurred, so that the network device can timely know the subband on which the uplink congestion failure has occurred, and thus data transmission and reception can be restored on another subband, reducing data interruption delay and improving communication efficiency.

The network device provided in this embodiment of this disclosure can implement the procedures of the foregoing method embodiment shown in FIG. 3. To avoid repetition, details are not described herein again.

Figure 6:
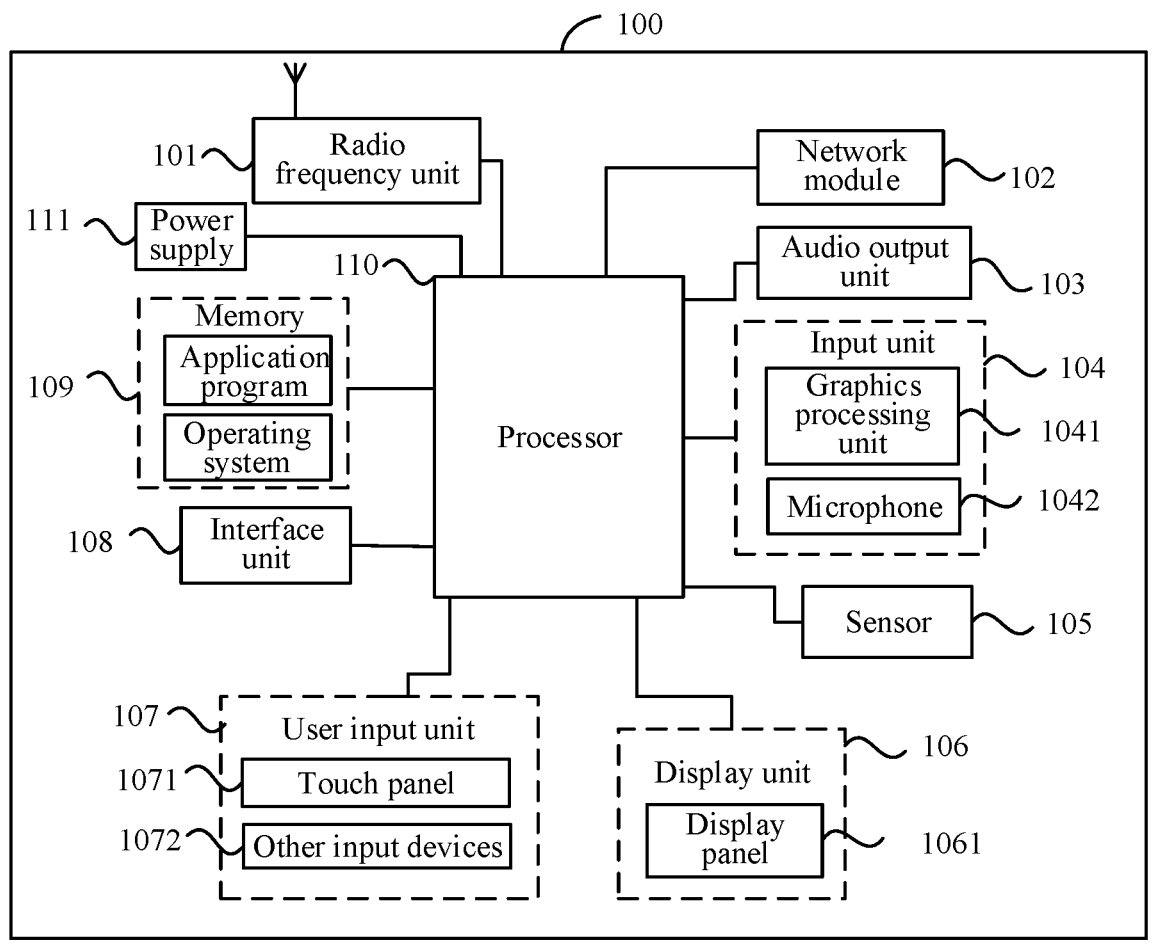
FIG. 6 is a second schematic structural diagram of a terminal device according to an embodiment of this disclosure.

FIG. 6 is a schematic diagram of a hardware structure of a terminal device for implementing the embodiments of this disclosure. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. Persons skilled in the art can understand that the structure of the terminal device 100 shown in FIG. 6 does not constitute any limitation on the terminal device. The terminal device 100 may include more or fewer components than those shown in the figure, or a combination of some components, or the components disposed differently. In this embodiment of this disclosure, the terminal device 100 includes but is not limited to a mobile phone, a tablet computer, a laptop computer, a palmtop computer, an in-vehicle terminal device, a wearable device, a pedometer, and the like.

The processor 110 is configured to perform a target operation in a case of detecting that an uplink congestion failure has occurred on a first subband, where the target operation includes at least one of the following: a first operation and a second operation, the first operation is transmitting an uplink signal to a network device, the second operation is triggering a wireless connection re-establishment procedure, and the uplink signal is used to indicate failure information of the uplink congestion failure.

In the terminal device provided in this embodiment of this disclosure, the terminal device performs the target operation in a case of detecting that the uplink congestion failure has occurred on the first subband, where the target operation includes at least one of the following: an operation of transmitting an uplink signal to a network device by the terminal device, and an operation of triggering a wireless connection re-establishment procedure, so that an effective processing operation can be performed in a case that the uplink congestion failure has occurred on the first subband, improving communication efficiency.

It should be understood that, in this embodiment of this disclosure, the radio frequency unit 101 may be configured to transmit and receive a signal in an information transmitting/receiving or call process. Specifically, the radio frequency unit 101 receives downlink data from a base station and transmits the downlink data to the processor 110 for processing; and transmits uplink data to the base station.

Generally, the radio frequency unit 101 includes but is not limited to an antenna, at least one amplifier, a transceiver, a coupler, a low noise amplifier, a duplexer, and the like. In addition, the radio frequency unit 101 may also communicate with a network and other devices via a wireless communications system.

The terminal device 100 provides a user with wireless broadband Internet access by using the network module 102, for example, helping the user to transmit or receive an email, browse a web page, and access streaming media.

The audio output unit 103 may convert audio data received by the radio frequency unit 101 or the network module 102 or stored in the memory 109 into an audio signal and output the audio signal as a sound. In addition, the audio output unit 103 may also provide audio output (for example, a call signal received sound or a message received sound) related to a specific function performed by the terminal device 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a still picture or a video obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or transmitted by using the radio frequency unit 101 or the network module 102. The microphone 1042 is capable of receiving sounds and processing such sounds into audio data. The processed audio data can be converted in a telephone call mode into a format that can be transmitted by the radio frequency unit 101 to a mobile communication base station, for outputting.

The terminal device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a motion sensor, an accelerometer sensor may detect magnitudes of an acceleration in various directions (usually three axes), may detect a magnitude and a direction of gravity when the terminal device is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 105 may further include a fingerprint sensor, a pressure sensor, an iris sensor, a molecular sensor, a gyroscope, a barometer, a hygrometer, a thermometer, or an infrared sensor. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information and generate key signal input related to user setting and function control of the terminal device 100. Specifically, the user input unit 107 includes a touch panel 1071 and other input devices 1072. The touch panel 1071, or referred to as a touchscreen, may capture a touch operation performed by a user on or near the touch panel 1071 (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 110, and receives and executes a command transmitted by the processor 110. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (for example, a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 for determining a type of the touch event. Then, the processor 110 provides a corresponding visual output on the display panel 1061 based on the type of the touch event. Although in FIG. 6, the touch panel 1071 and the display panel 1061 act as two separate parts to implement input and output functions of the terminal device 100, in some embodiments, the touch panel 1071 and the display panel 1061 may be integrated to implement the input and output functions of the terminal device 100. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive an input (for example, data information or power) from an external apparatus and transmit the received input to one or more elements within the terminal device 100, or may be configured to transmit data between the terminal device 100 and the external apparatus.

The memory 109 may be configured to store software programs and various data. The memory 109 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 109 may include a high-speed random access memory, and may further include a non-volatile memory such as a disk storage device, a flash memory device, or another volatile solid-state storage device.

The processor 110 is a control center of the terminal device 100, uses various interfaces and lines to connect parts of the entire terminal device 100, and executes various functions and processing data of the terminal device 100 by running or executing software programs and/or modules stored in the memory 109 and invoking data stored in the memory 109, so as to perform overall monitoring on the terminal device 100. The processor 110 may include one or more processing units. Optionally, the processor 110 may integrate an application processor and a modem processor. The application processor mainly processes an operating system, a user interface, an application program, and the like. The modem processor mainly processes wireless communication. It can be understood that the modem processor may alternatively be not integrated in the processor 110.

The terminal device 100 may further include the power supply 111 (for example, a battery) that supplies power to the components. Optionally, the power supply 111 may be logically connected to the processor 110 through a power management system, so as to implement functions such as charging management, discharging management, and power consumption management through the power management system.

In addition, the terminal device 100 includes some functional modules that are not shown. Details are not described herein.

Figure 7:
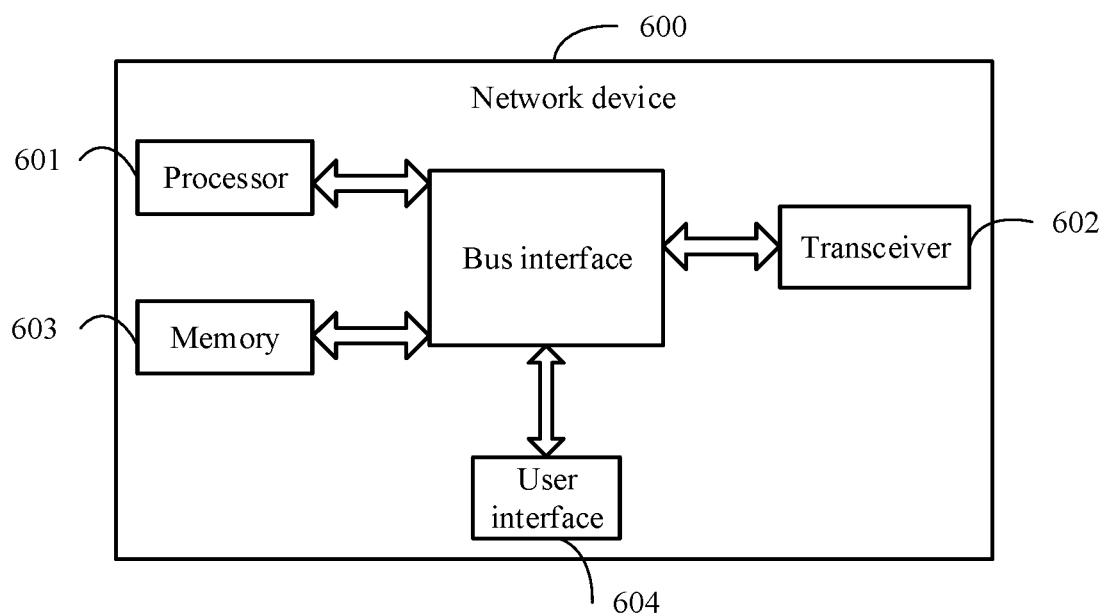
FIG. 7 is a second schematic structural diagram of a network device according to an embodiment of this disclosure.

FIG. 7 is a schematic diagram of a hardware structure of a network device for implementing the embodiments of this disclosure. The network device 600 includes a processor 601, a transceiver 602, a memory 603, a user interface 604, and a bus interface.

The transceiver 602 is configured to receive an uplink signal from a terminal device, where the uplink signal is used to indicate failure information of an uplink congestion failure that has occurred on a first subband. The processor 601 is configured to determine the first subband based on the uplink signal.

In the network device provided in this embodiment of this disclosure, after receiving the uplink signal transmitted by the terminal device, the network device can determine, based on the uplink signal, the first subband on which the uplink congestion failure has occurred, so that the network device can timely know the subband on which the uplink congestion failure has occurred, and thus data transmission and reception can be restored on another subband, reducing data interruption delay and improving communication efficiency.

In this embodiment of this disclosure, in FIG. 7, a bus architecture may include any quantity of interconnect buses and bridges, specifically for interconnecting various circuits of one or more processors represented by the processor 601 and a memory represented by the memory 603. The bus architecture may further interconnect various other circuits such as a peripheral device, a voltage regulator, and a power management circuit. These are all common sense in the art, and therefore are not further described in this specification. The bus interface provides an interface. The transceiver 602 may be a plurality of components, that is, the transceiver 602 includes a transmitter and a receiver, and provides a unit for communicating with various other apparatuses on a transmission medium. For different user equipment, the user interface 604 may also be an interface that can be externally or internally connected to a required device, and the connected device includes but is not limited to a keypad, a display, a speaker, a microphone, a joystick, and the like. The processor 601 is responsible for management of the bus architecture and general processing, and the memory 603 may store data for use by the processor 601 when the processor 601 performs an operation.

In addition, the network device 600 further includes some functional modules that are not shown, details of which are not described herein.

Optionally, an embodiment of this disclosure further provides a terminal device, including a processor, a memory, and a computer program stored in the memory and capable of running on the processor. When the computer program is executed by the processor, the procedures of the processing method corresponding to FIG. 2 are implemented, with the same technical effect achieved. To avoid repetition, details are not described herein again.

Optionally, an embodiment of this disclosure further provides a network device, including a processor, a memory, and a computer program stored in the memory and capable of running on the processor. When the computer program is executed by the processor, the procedures of the processing method corresponding to FIG. 3 are implemented, with the same technical effect achieved. To avoid repetition, details are not described herein again.

An embodiment of this disclosure further provides a computer-readable storage medium. The computer-readable storage medium stores a computer program. When the computer program is executed by a processor, the procedures of the processing method in the foregoing embodiment are implemented, with the same technical effect achieved. To avoid repetition, details are not described herein again. The computer-readable storage medium includes a read-only memory (ROM for short), a random access memory (RAM for short), a magnetic disk, an optical disc, or the like.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation though. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the method described in several embodiments of this disclosure.

The foregoing describes the embodiments of this disclosure with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this disclosure and the protection scope of the claims, and all such manners fall within the protection scope of this application.

What is claimed is:

1. A processing method, applied to a terminal device, wherein the method comprises:
   performing a target operation in a case of detecting that an uplink congestion failure has occurred on a first subband, wherein the target operation comprises a first operation; and the first operation is transmitting an uplink signal to a network device, the uplink signal is used to indicate failure information of the uplink congestion failure, and the failure information of the uplink congestion failure is used to indicate a cell corresponding to the first subband;

the uplink congestion failure comprises a listen before talk (LBT) failure; and the first subband comprises at least one of subbands for bandwidth part (BWP);

wherein the transmitting an uplink signal to a network device comprises:

transmitting the uplink signal to the network device on a second subband, wherein the second subband is a subband on which no uplink congestion failure has occurred;

wherein the second subband comprises at least one of the following: a subband on which no uplink congestion failure has occurred in a second cell, or a subband on which no uplink congestion failure has occurred in a third cell, wherein the second cell is a cell corresponding to the first subband; and the third cell is different from the second cell;

wherein the subband on which no uplink congestion failure has occurred in the second cell comprises: a subband on which no uplink congestion failure has occurred in a second BWP of the second cell, wherein a first BWP is a BWP corresponding to the first subband, and the second BWP is another subband in the second cell different from the first BWP.

2. The method according to claim 1, wherein a subband configured by the network device for a first cell of the terminal device comprises the first subband; and before the performing a target operation, the method further comprises:

if the number of first subbands is greater than or equal to M, determining that the uplink congestion failure has occurred in the first cell, wherein M is a positive integer, and M is configured by the network device or prescribed in a protocol.

3. The method according to claim 1, wherein after the performing a target operation in a case of detecting that an uplink congestion failure has occurred on a first subband, the method further comprises:

receiving feedback information from the network device.

4. The method according to claim 3, wherein the receiving feedback information from the network device comprises:

receiving the feedback information from the network device on a third subband, wherein the third subband is a subband on which no uplink congestion failure has occurred.

5. The method according to claim 1, wherein the uplink signal comprises at least one of the following: a random access channel signal, Msg3 information of a random access procedure, a scheduling request (SR) signal, a radio resource control (RRC) message, or a media access control (MAC) control element.

6. The method according to claim 1, wherein the failure information of the uplink congestion failure is further used to indicate at least one of the following: a number of the first subband, a frequency of the first subband, a bandwidth of the first subband, or a BWP corresponding to the first subband.

7. The method according to claim 1, wherein in a case that an uplink congestion failure has occurred in a primary cell of the terminal device, the target operation comprises the first operation; or in a case that an uplink congestion failure has occurred in a primary secondary cell of the terminal device, the target operation is the first operation; or in a case that an uplink congestion failure has occurred in all cells of a master cell group of the terminal device, the target operation comprises the first operation; or in a case that an uplink congestion failure has occurred in all cells of a secondary cell group of the terminal device, the target operation is the first operation; or in a case that an uplink congestion failure has occurred in a secondary cell of the terminal device, the target operation is the first operation.

8. A processing method, applied to a network device, wherein the method comprises:

receiving an uplink signal from a terminal device, wherein the uplink signal is used to indicate failure information of an uplink congestion failure that has occurred on a first subband, and the failure information of the uplink congestion failure is used to indicate a cell corresponding to the first subband; wherein the uplink congestion failure comprises a listen before talk (LBT) failure; and the first subband comprises at least one of subbands for bandwidth part (BWP);

wherein the receiving an uplink signal from a terminal device comprises:

receiving the uplink signal from the terminal device on a second subband, wherein the second subband is a subband on which no uplink congestion failure has occurred;

wherein the second subband comprises at least one of the following: a subband on which no uplink congestion failure has occurred in a second cell, or a subband on which no uplink congestion failure has occurred in a third cell, wherein the second cell is a cell corresponding to the first subband; and the third cell is different from the second cell;

wherein the subband on which no uplink congestion failure has occurred in the second cell comprises: a subband on which no uplink congestion failure has occurred in a second BWP of the second cell, wherein a first BWP is a BWP corresponding to the first subband, and the second BWP is another subband in the second cell different from the first BWP.

9. The method according to claim 8, wherein after the receiving an uplink signal from a terminal device, the method further comprises:

transmitting feedback information to the terminal device on the second subband.

10. The method according to claim 8, wherein the uplink signal comprises at least one of the following: a random access channel signal, Msg3 information of a random access procedure, a scheduling request (SR) signal, a radio resource control (RRC) message, or a media access control (MAC) control element.

11. The method according to claim 8, wherein the failure information of the uplink congestion failure is further used to indicate at least one of the following: a number of the first subband, a frequency of the first subband, a bandwidth of the first subband, or a BWP corresponding to the first subband.

12. A terminal device, comprising a processor, a memory, and a computer program stored in the memory and capable of running on the processor, wherein the computer program is executed by the processor to implement:

performing a target operation in a case of detecting that an uplink congestion failure has occurred on a first subband, wherein the target operation comprises a first operation; and the first operation is transmitting an uplink signal to a network device, the uplink signal is used to indicate failure information of the uplink congestion failure, and the failure information of the uplink congestion failure is used to indicate a cell corresponding to the first subband;

the uplink congestion failure comprises a listen before talk (LBT) failure; and the first subband comprises at least one of subbands for bandwidth part (BWP);

wherein the transmitting an uplink signal to a network device comprises:

transmitting the uplink signal to the network device on a second subband, wherein the second subband is a subband on which no uplink congestion failure has occurred;

wherein the second subband comprises at least one of the following: a subband on which no uplink congestion failure has occurred in a second cell, or a subband on which no uplink congestion failure has occurred in a third cell, wherein the second cell is a cell corresponding to the first subband; and the third cell is different from the second cell;

wherein the subband on which no uplink congestion failure has occurred in the second cell comprises: a subband on which no uplink congestion failure has occurred in a second BWP of the second cell, wherein a first BWP is a BWP corresponding to the first subband, and the second BWP is another subband in the second cell different from the first BWP.

13. The terminal device according to claim 12, wherein a subband configured by the network device for a first cell of the terminal device comprises the first subband; and before the performing a target operation, the computer program is executed by the processor to further implement:

if the number of first subbands is greater than or equal to M, determining that the uplink congestion failure has occurred in the first cell, wherein M is a positive integer, and M is configured by the network device or prescribed in a protocol.

14. A network device, comprising a processor, a memory, and a computer program stored in the memory and capable of running on the processor, wherein when the computer program is executed by the processor, the steps of the processing method according to claim 8 are implemented.

* * * * *